United States Patent [19]

Wolpert

[11] Patent Number: 5,093,641
[45] Date of Patent: Mar. 3, 1992

[54] RECTIFIER SMOOTHING FILTER

[75] Inventor: Tadeus Wolpert, Bandhagen, Sweden

[73] Assignee: Telefonaktiebolaget L M Ericsson, Stockholm, Sweden

[21] Appl. No.: 510,581

[22] Filed: Apr. 18, 1990

[30] Foreign Application Priority Data

Jun. 20, 1989 [SE] Sweden ............... 8902232

[51] Int. Cl.$^5$ .................. H03H 7/00; H02M 1/12
[52] U.S. Cl. ..................... 333/181; 363/45; 363/47
[58] Field of Search ............ 333/167, 174, 177, 178, 333/172, 181, 12, 175; 363/45, 47, 48, 39

[56] References Cited

U.S. PATENT DOCUMENTS

| | | | |
|---|---|---|---|
| 1,852,125 | 4/1932 | Miessner | 363/47 X |
| 3,246,229 | 2/1962 | Lloyd | 363/48 |
| 3,660,787 | 5/1972 | Mahmound et al. | 333/12 X |
| 3,745,443 | 7/1973 | Weil | 363/47 X |
| 3,761,797 | 9/1973 | Spooner | 363/46 |
| 4,791,543 | 12/1988 | Chadwick et al. | 363/48 |
| 4,795,959 | 1/1989 | Cooper | 363/39 X |

FOREIGN PATENT DOCUMENTS 1203839 10/1965 Fed. Rep. of Germany.
0930521 5/1982 U.S.S.R. .............. 363/39

OTHER PUBLICATIONS

Derwents Abstract No. J1160 D/35, SU 777782, Nov., 1980.

Primary Examiner—Eugene R. LaRoche
Assistant Examiner—Seung Ham
Attorney, Agent, or Firm—Burns, Doane, Swecker & Mathis

[57] ABSTRACT

A smoothing filter for a rectifier (LR) includes a series inductance (L) and a parallel capacitance (C). Because the capacitive voltage drop ($V_c$) is in counterphase relative to the inductive voltage drop ($V_c$) there is found on the series inductance (L) a point (K) where the voltage drop towards earth is zero for a given frequency (fg). The load (Z) on the rectifier is connected to this point (K) in order to achieve high attenuation the fundamental harmonic of the ripple voltage at this frequency.

2 Claims, 2 Drawing Sheets

RECTIFIER SMOOTHING FILTER

FIELD OF THE INVENTION

The present invention relates to a rectifier smoothing filter according to the preamble of claim 1. More specifically, the invention relates to a smoothing filter for use with a rectifier for telephony systems in which high demands are placed on damping of the ripple voltage from the rectifier part.

BACKGROUND OF THE INVENTION

In addition to the direct voltage, alternating voltages of mutually different frequencies (ripple voltage) will normally occur over the output of a static converter, for instance a rectifier. The ripple voltage is attenuated, by providing the rectifier with a smoothing filter on the output thereof. FIG. 1 of the accompanying drawings illustrates a rectifier LR provided with one such filter comprising an inductance L and a capacitance C. Great demand is placed on the attenuation of ripple voltage in telephony systems, e.g. on the current supply of telephone exchanges. A permitted level for frequencies around 1 KHz is beneath 1 mV.

The known smoothing filter illustrated in FIG. 1 is a passive filter in which the inductance L consists of chokes and the capacitance C of electrolyte capacitors.

If the fundamental harmonic of the ripple voltage has the frequency fg, the attenuation of the filter is $$d = \frac{V_{in}}{V_o} = \frac{V_L - V_c}{V_c} = \frac{X_L - X_C}{X_C} = W_g^2 LC - 1$$

When $X_L >> X_C$, as is normally the case, the attenuated can be expressed approximatively as $$d = \frac{X_L}{X_C} = w^2 LC$$

As a rule, filters used in practice have a powerful attenuation effect on the fundamental harmonic $\omega_g$ of the ripple voltage $$d = \omega_g^2 LC >> 1$$

and higher frequencies, whereas attenuation of the direct voltage (resistive voltage drop) is negligible.

Filters can comprise one or more LC stages.

Values for a rectifier 48V=400A=are given as an example. L=100 μH C=160 000 μF fundamental frequency of the ripple voltage fg=600 Hz.

The following relationship applies for this frequency $$X_L = 2\pi f_g \cdot L = 380 \text{ m}\Omega$$

$$X_C = \frac{1}{2\pi f_g C} = 1.6 \text{ m}\Omega$$

while the attenuation is $$d = \frac{X_L}{X_C} = g^2 LC = 237$$

The components of rectifier smoothing filters operating at the mains frequency are both large and expensive. In particular, the chokes designed for large direct currents are bulky, heavy and expensive. For example, the choke 400A above weighs 25 kg and costs about 1500 SEK. The rectifier requires two such chokes in order to fulfil the ripple voltage requirement on its output.

SUMMARY OF THE INVENTION

In accordance with the present invention there is proposed a passive rectifier smoothing filter of a configuration different from the known filter illustrated in FIG. 1. The novel filter provides considerably improved attenuation of the fundamental harmonic $\omega_g$ of the ripple while retaining the sizes of the filter components.

The invention is based on the observation that in the case of the smoothing filter illustrated in FIG. 1 there is a point on the choke winding L where the voltage relative to earth or ground is equal to zero for the alternating component (AC) of the ripple voltage whose frequency is $\omega_g$. By connecting the load to the aforesaid point, considerable improvement can be obtained in the attenuation of the fundamental harmonic $\omega_g$ of the ripple voltage.

Accordingly, the object of the present invention is to provide a rectifier smoothing filter which will provide much better attenuation of the fundamental harmonic of the ripple voltage than earlier known passive smoothing filters.

BRIEF DESCRIPTION OF THE DRAWINGS

The invention will now be described in more detail with reference to the accompanying drawings, in which.

DETAILED DESCRIPTION OF THE PREFERRED EMBODIMENT

Figure 1:
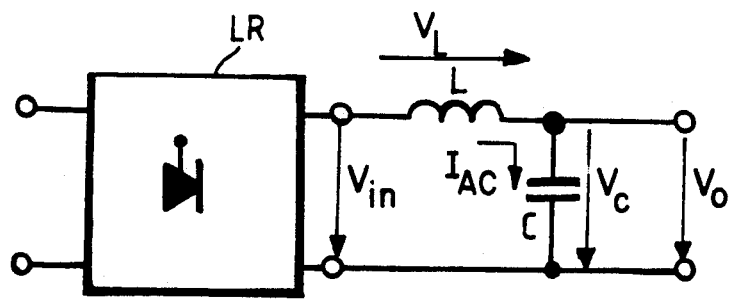
FIG. 1 is a circuit diagram of a conventional passive smoothing filter.
Figure 2:
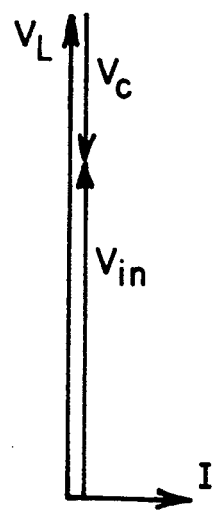
FIG. 2 is a rotation-vector diagram of the voltage and current in the filter illustrated in FIG. 1.

When considering first the known circuit illustrated in FIG. 1, it is possible to draw a rotating-vector diagram according to FIG. 2 for an alternating voltage component of given frequency. The following r apply for this diagram:

$$\hat{V}_L = \hat{I}_{AC} \cdot jwL$$

$$\hat{V}_C = \hat{I}_{AC}\left(\frac{-j}{wC}\right)$$

$$\hat{V}_{in} = \hat{V}_L + \hat{V}_C = \hat{I}_{AC}\left(wL - \frac{1}{wC}\right)$$

if the resistive voltage drops are ignored. Thus, the capacitor voltage $V_c$ is in counterphase with $V_{in}$ and $V_L$. In the circuit diagram illustrated in FIG. 3, the known smoothing filter is identified with the reference signs used in the diagrams shown in FIGS. 4a, 4b. The number of turns of the choke coil L is designated N and the two end points of the coil are referenced A and B respectively. The point K on the coil is the point at which the number of turns from the one end point B equals $n_k$.

Figure 4A:
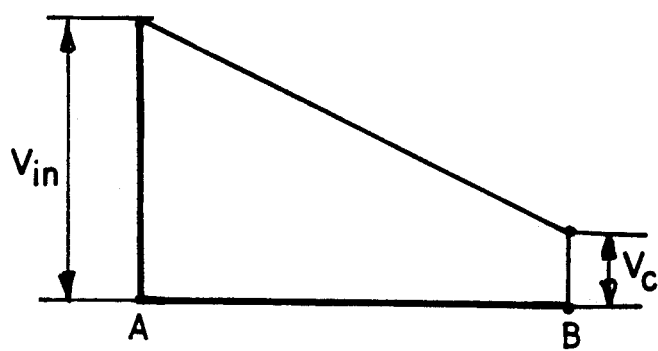
FIGS. 4a, 4b are diagrams of different voltages in the filter illustrated in FIG. 3.
Figure 4B:
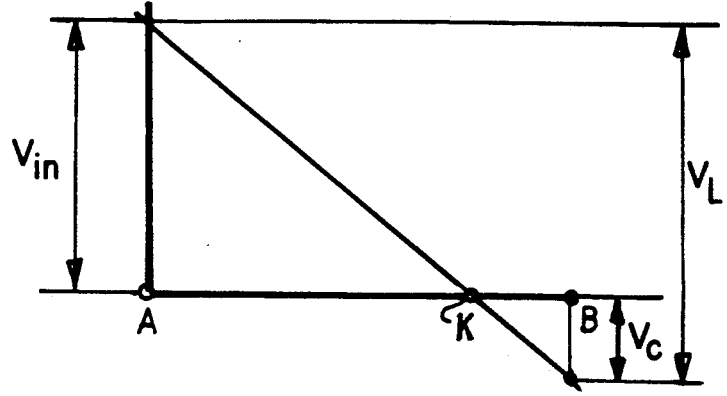
Figure 3:
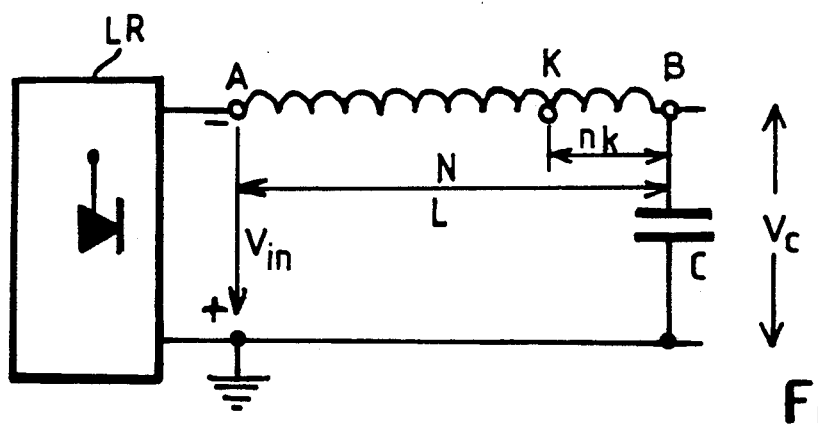
FIG. 3 is a simplified illustration of the known smoothing filter, shown for the purpose of explaining the inventive concept in more detail.
Figure 5:
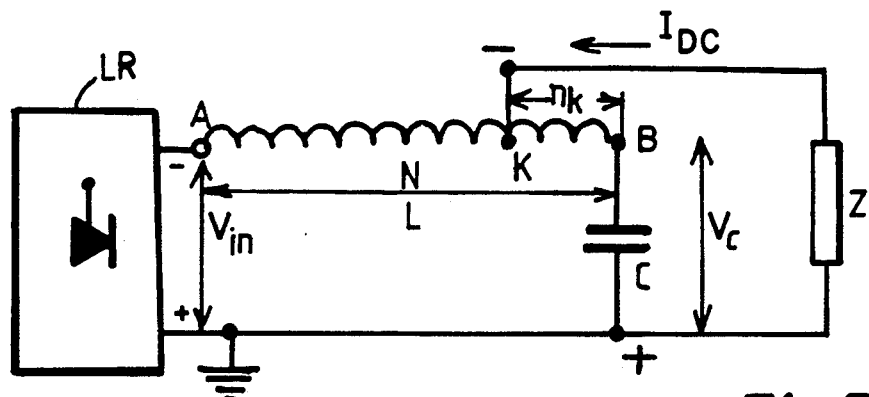
FIG. 5 is a diagrammatic illustration of the inventive smoothing filter.

When the alternating voltage is followed from the point A in FIG. 3 to the point B, it is found that this voltage is linear from the value $V_{in}$ at point A to a lower value $V_c$ at point B in FIG. 4a. However, due to a presence of a capacitance C connected between B and earth, the alternating voltage will fall towards the point B as in FIG. 4b, since $V_{in}$ and $V_c$ have opposite phase positions according to the rotating-vector diagram in FIG. 2. Thus, in the presence of a capacitance C there is a point k on the choke coil at which the alternating voltage relative to earth is equal to zero. If the current tap-off point, at which direct current is taken to the load, is placed at point K instead of at point B, as in the known smoothing filter (FIGS. 1, 3), damping of the fundamental harmonic of the ripple voltage can be greatly improved, see the circuit diagram of FIG. 5. This FIG. 5 illustrates a smoothing filter whose choke winding is divided into two parts AK and KB each having an inductance $L_1$ and $L_2$. The load Z is therewith connected to earth and to the point K. The total number of turns of the choke coil is designated N and the number of turns of the choke part KB is designated $n_k$ in FIG. 5. The position of the point K can therewith be determined for the frequency $w_g$ from FIG. 5 in accordance with the following relationship:

$$\frac{n_k}{N} = \frac{V_C}{V_L} = \frac{X_C}{X_L} = \frac{1}{w_g^2 LC}$$

The voltage at K will not be exactly equal to zero in practice, due to the resistive voltage drop in the choke winding, among other things. It has been found in practice, however, that the alternating voltage $V_k$ in K can be readily brought down to about 0.1 of $V_c$.

The inventive filter enables the size and cost of components to be considerably reduced.

Another improvement over a conventional filter is that the winding part KB need not be dimensioned for direct current $I_{DC}$, but need only be dimensioned for the much smaller alternating component $I_{AC}$. In this way, a higher inductance L is obtained from a given core size than with a conventional circuit.

I claim:

1. A smoothing filter for a rectifier having a load and generating a voltage having a pulsation voltage component, comprising:

a capacitor;

a choke coil having a first number of coil turns N, said choke coil having first, second, and third tap-off points, said first tap-off point being connected to said rectifier, said second tap-off point being connected to said capacitor, and said third tap-off point (K) dividing said choke coil into a first portion having a second number of coil turns (N-$n_k$) and a second portion having a third number of coil turns $n_k$ respectively, wherein $n_k$ represents a number of coil turns from said second tap-off point to said third tap-off point, said third tap-off point being selected so that said third number of coil turns is $$n_k = \frac{N}{(2\pi f_g)^2 LC} .$$

where $f_g$ is the frequency of the fundamental harmonic of said pulsation voltage component, L is the total inductance of said choke coil, and C is the capacitance of said capacitor; and a load connected to said third tap-off point on the choke coil.

2. A smoothing filter according to claim 1, wherein said third number of turns $n_k$ of said second portion of said choke coil is determined independent of any alternating components of current generated by said rectifier.

* * * * *